United States Patent [19]

Lutz et al.

[11] Patent Number: 4,624,351

[45] Date of Patent: Nov. 25, 1986

[54] FRICTION DISC CLUTCH FOR A MOTOR VEHICLE

[75] Inventors: Dieter Lutz, Schweinfurt; Wolfgang Thieler, Hassfurt-Uchenhofen, both of Fed. Rep. of Germany

[73] Assignee: Sachs-Systemtechnik GmbH, Schweinfurt, Fed. Rep. of Germany

[21] Appl. No.: 679,636

[22] Filed: Dec. 11, 1984

[30] Foreign Application Priority Data

Dec. 16, 1983 [DE] Fed. Rep. of Germany ....... 3345541

[51] Int. Cl.⁴ .................. F16D 47/02; F16D 3/12; F16F 15/12; F02N 11/00

[52] U.S. Cl. .................. 192/48.5; 192/70.17; 192/104 C; 192/106.1; 74/7 C; 74/7 R; 74/574

[58] Field of Search ........... 192/30 V, 48.3, 48.5, 192/70.17, 104 C, 106.1, 106.2; 74/7 A, 7 C, 7 R, 574; 464/66, 67, 68, 89, 90, 91

[56] References Cited

U.S. PATENT DOCUMENTS

| | | | |
|---|---|---|---|
| 1,918,249 | 7/1933 | Dashefsky | 74/574 |
| 2,514,228 | 7/1950 | Dodge | 192/104 C |
| 2,746,585 | 5/1956 | Binder | 192/104 C |
| 4,244,240 | 1/1981 | Rabenhorst | 74/574 X |
| 4,468,207 | 8/1984 | Yoshida | 74/574 X |
| 4,526,260 | 7/1985 | Schierling | 192/106.1 X |

FOREIGN PATENT DOCUMENTS

| | | | |
|---|---|---|---|
| 49805 | 4/1982 | European Pat. Off. | 192/106.1 |
| 2826274 | 12/1978 | Fed. Rep. of Germany | . |
| 2902433 | 7/1980 | Fed. Rep. of Germany | 74/574 |
| 73730 | 6/1978 | Japan | 192/30 V |

Primary Examiner—Rodney H. Bonck
Assistant Examiner—David A. Testardi
Attorney, Agent, or Firm—Toren, McGeady, Stanger, Goldberg & Kiel

[57] ABSTRACT

The friction disc clutch for a motor vehicle driven by an internal combustion engine comprises a flywheel which is driven through a rotationally elastic element by the crankshaft of the internal combustion engine. The mass-spring system of the drive path of the clutch is so dimensioned that natural vibrations occur in or below the idling rotation rate range of the internal combustion engine. The rotationally elastic element can be bridged over for rotation rates in the range of and below the idling rotation rate in order to prevent resonance effects in idling and in the starting of the internal combustion engine. The bridge-over clutch can be formed by a pinion of the starter motor. Alternatively, centrifugal clutches can be used.

3 Claims, 4 Drawing Figures

1

FRICTION DISC CLUTCH FOR A MOTOR VEHICLE

BACKGROUND OF THE INVENTION

The invention relates to a friction disc clutch for a motor vehicle driven by an internal combustion engine, and especially to a friction disc clutch the flywheel of which is driven by the crankshaft of the internal combustion engine through a rotationally elastic element which damps torsional vibrations of the rotational drive path.

STATEMENT OF PRIOR ART

From German Publication Specification No. 28 26 274 a friction disc clutch is known in which the flywheel is mounted on the crankshaft through a spring torsional vibration damper. The spring torsional vibration damper in combination with a friction device damps torsional vibrations of the rotational drive path leading from the crankshaft by way of the friction disc clutch to the gear. With a decoupling of this kind, resonances of the mass—spring system of the rotational drive path at which great torsional vibration amplitudes and great accelerations occur are shifted into ranges of low rotation rate. At rotation rates pertaining to driving operation, resonance phenomena of this kind are hardly any trouble. However, problems can arise in the range of the idling rotation rate of the internal combustion engine, or in starting.

OBJECT OF THE INVENTION

It is an object of the invention to indicate a friction disc clutch for a motor vehicle driven by an internal combustion engine in which resonances caused by rotational vibration dampers of the clutch are moderated or suppressed.

SUMMARY OF THE INVENTION

According to the invention there is provided a friction disc clutch for a motor vehicle driven by an internal combustion engine, comprising a flywheel driveable in rotation by the internal combustion engine about a rotation axis, a clutch cover held on the flywheel, a presser plate connected non-rotatably but axially displaceably with the flywheel, a clutch disc provided with friction linings axially between the flywheel and the presser plate, a clutch spring device braced in between the clutch cover and the presser plate, a rotationally elastic element in the rotational drive path between the internal combustion engine and the flywheel to damp torsional vibrations of the rotation drive path, and a controllable bridge-over clutch for the rotation-fast bridging over the rotationally elastic element at rotation rates in the region of or below the idling rotation rate of the internal combustion engine.

The characteristic frequency of the rotational drive path formed at least by the crankshaft, the rotationally elastic element, the flywheel, the presser plate and the clutch cover, but possibly also the clutch disc and the gear input shaft, is lowered, by suitable attunement of the masses and springs of this system into the region of the idling rotation rate, but preferably below that. Consequent resonances at these low rotation rates do not however take effect, since the rotationally elastic element is bridged over by the bridge-over clutch. Thus, the resonance properties of the system are modified by

2 variation of the spring characteristics, and the resonance is suppressed.

In a first preferred embodiment the bridge-over clutch is formed as a centrifugal clutch. The centrifugal clutch can be made as a dog clutch or as a friction clutch and can liberate the rotationally elastic element to damp the torsional vibrations above the resonance range. In this embodiment the changeover rotation rate can be varied within wide limits and adapted to the resonance characteristics of the mass-spring system.

In another preferred embodiment it is ensured by the dimensioning of the mass-spring system that the undesired characteristic vibrations occur only below the idling rotation rate of the internal combustion engine, and thus are no disturbance in the driving operation of the motor vehicle. In order to prevent resonance troubles in the starting up of the internal combustion engine too, the flywheel, connected through the rotationally elastic element with the crankshaft, and a starter gear arranged beside the flywheel and connected non-rotatably to the crankshaft are provided with starter toothings arranged side by side in which a pinion of the starter motor engages in common in starting. The starter pinion forms a bridge-over coupling which bridges over the rotationally elastic element by way of the flywheel and the starter gear during starting.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
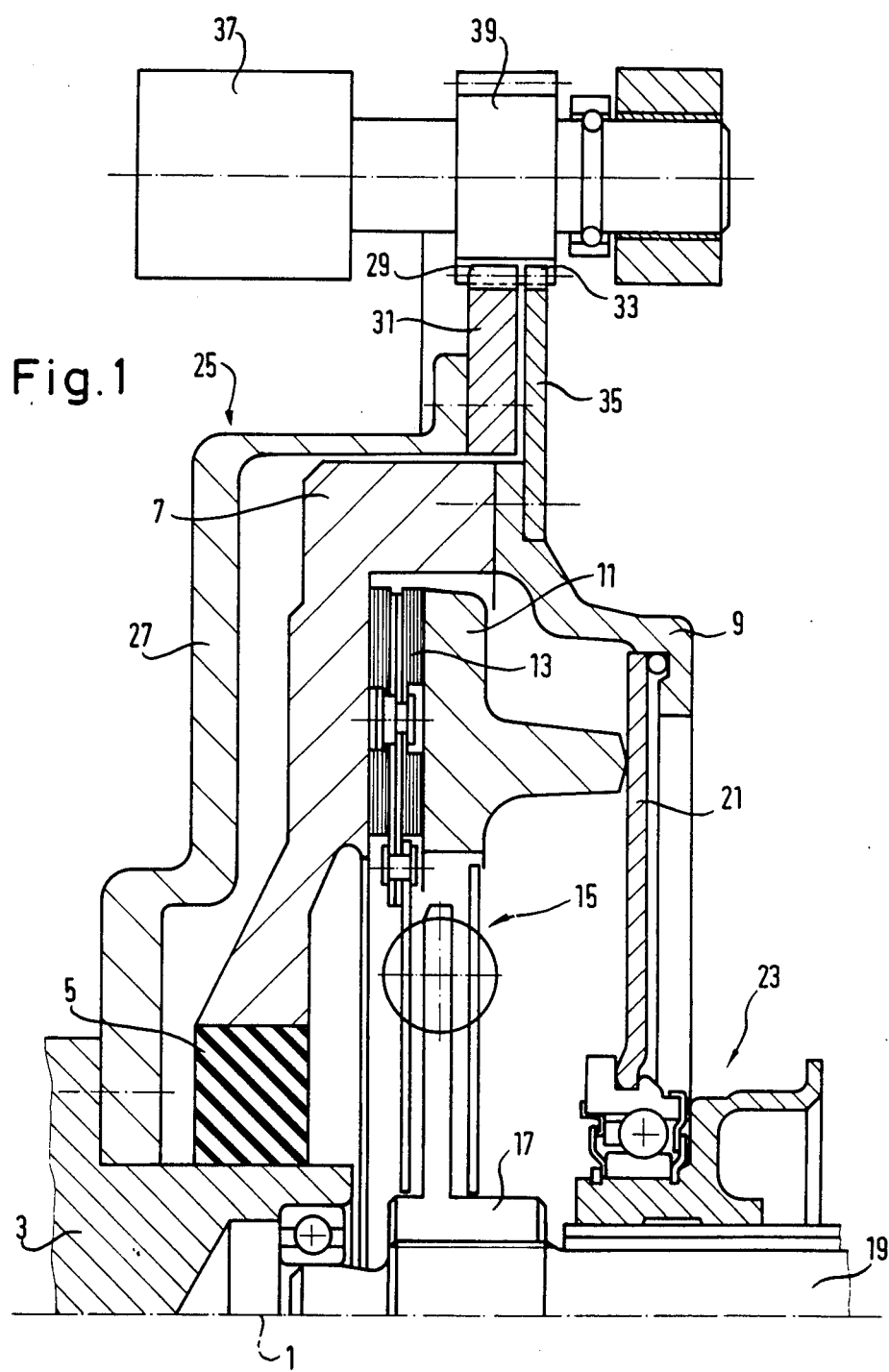
FIG. 1 shows an axial longitudinal section through a friction disc clutch according to the invention with a bridge-over clutch formed by a starter motor pinion.

A flywheel 7 is held through a rotationally elastic element 5 on a crankshaft 3, rotating about an axis 1 of rotation, of an internal combustion engine. The rotationally elastic element consists of elastic material and transmits the torque of the crankshaft 3 to the flywheel 7, damping torsional vibrations. The elastic element 5 can also be a spring torsional vibration damper of conventional construction type, as also used for example in clutch discs. A clutch cover 9 is secured to the flywheel 7. A presser plate 11 guided non-rotatably but axially displaceably in relation to the flywheel 7 is arranged in the clutch cover 9. A clutch disc 15 provided with friction linings 13 is seated axially between the presser plate 11 and the flywheel 7 and its hub 17 is mounted non-rotatably but axially displaceably on an input shaft 19 of a motor vehicle gear. A diaphragm spring 21 braced in between the cover 9 and the presser plate 11 presses the presser plate 11, through the clutch disc 15, against the flywheel 7. The clutch can be released against the force of the diaphragm spring 21 by means of a releaser arrangement 23.

On the side of the flywheel axially remote from the clutch disc 15 a starter gear 25 is secured non-rotatably on the crankshaft 3. The starter gear 25 comprises a carrier 27 grasping in pot form around the flywheel 7 and carrying an annular toothed rim 31 provided with an external toothing 29. A second toothed rim 35 provided with an external toothing 33 is secured to the flywheel 7 axially beside the toothed rim 31. The two external toothings 29, 33 lie axially close beside one another so that in the starting of the internal combustion engine a pinion 39 driveable by a starter motor 37 engages simultaneously in both external toothings 29, 33 and bridges over the toothed rims 31, 35. The pinion 39, which is withdrawn from the external toothings 29, 33 when the internal combustion engine has started, bridges over the rotationally elastic element 5 during starting and suppresses characteristic resonances of the rotational drive path which occur below the idling rotation rate. FIG. 1 shows the starting condition of the internal combustion engine.

Figure 2:
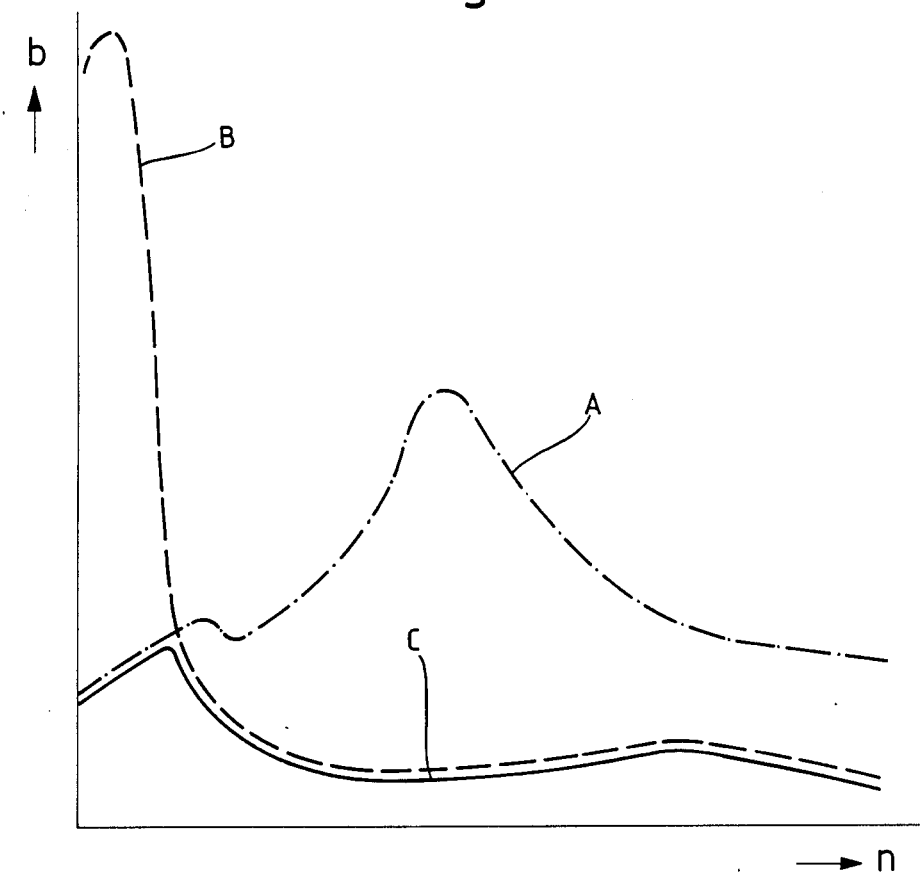
FIG. 2 shows diagrams to explain the acceleration characteristic b of the flywheel side of the rotational drive path in dependence upon the rotation rate n of the internal combustion engine.

FIG. 2 shows the acceleration curve at the locus of the flywheel 7 as caused by resonances of the drive rotation path consisting of the crankshaft 3, the carrier 27, the flywheel 7, the cover 9, the toothed rims 31, 35, the presser plate 11, the diaphragm spring 21, the releaser arrangement 23 and possibly the clutch disc 15 and the gear input shaft 19. The clutch disc 15 and the gear input shaft 19 however do not substantially influence the vibration behavior here. The curve A shows the acceleration behavior on bridging over of the rotationally elastic element 5. A resonance rise occurs at rotation rates which are achieved substantially only during driving operation of the motor vehicle. The curve B shows the acceleration behavior when the rotationally elastic element is not bridged over. Due to the dimensioning of the mass—spring system of the rotational drive path, while the resonance rise is increased, it is however placed in a rotation rate range below the idling rotation rate of the internal combustion engine. Very small acceleration values and no resonances occur above the resonance range, that is in the rotation rate range utilized in driving operation. The curve C shows the characteristic of the clutch according to the invention. In the starting up of the internal combustion engine the characteristic follows the curve A, since the starter pinion 39 bridges over the rotationally elastic element 5. After the internal combustion engine starts up and the pinion 39 moves out into its rest position, the rotationally elastic element 5 is effective and the curve C substantially follows the curve B.

Figure 3:
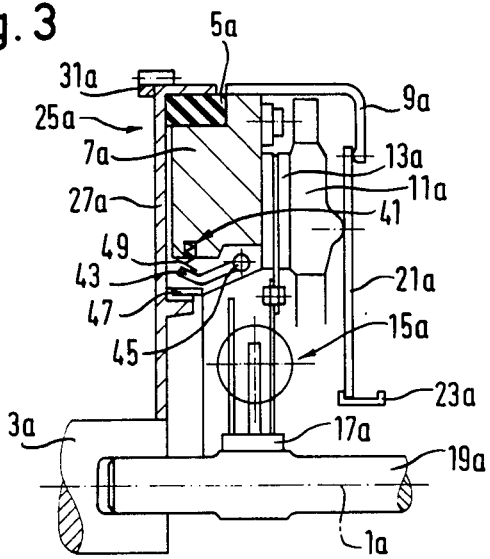
FIGS. 3 and 4 show sketches of principle, represented in axial longitudinal section, with different embodiments of friction disc clutches with rotationally elastic elements which can be bridged over.

FIG. 3 shows another embodiment in which resonances of the rotational drive path below the idling rotation rate up to resonances in the region of the idling rotation rate can be effectively suppressed. Parts of like effect are designated with reference numerals of FIG. 1 and provided with the letter a for distinction. Therefore, reference is made to the description of FIG. 1 for explanation of the manner of operation.

The clutch differs essentially in the mounting of its flywheel 7a on the carrier 27a. While the flywheel 7 in FIG. 1 is mounted on an inner diameter on the rotationally elastic element 5, the rotationally elastic element 5a mounts the flywheel 7a in the region of an external diameter on the carrier 27a.

The bridge-over clutch is formed as centrifugal dog clutch 41 and comprises at least one centrifugal claw 43 of pawl type which is mounted on the flywheel 7a pivotably about a pivot axis 45 extending circumferentially of the flywheel 7a. On the radially inwardly situated pivot side the carrier 27a carries a toothing 47 into which the centrifugal claw 43 is initially stressed by a spring 49. The centrifugal dog clutch 41 is dimensioned so that it is closed in the range of the idling rotation rate and at lower rotation rates and opens at rotation rates thereabove. The rotationally elastic element 5a is thus bridged over and ineffective in the range below the idling rotation rate.

Figure 4:
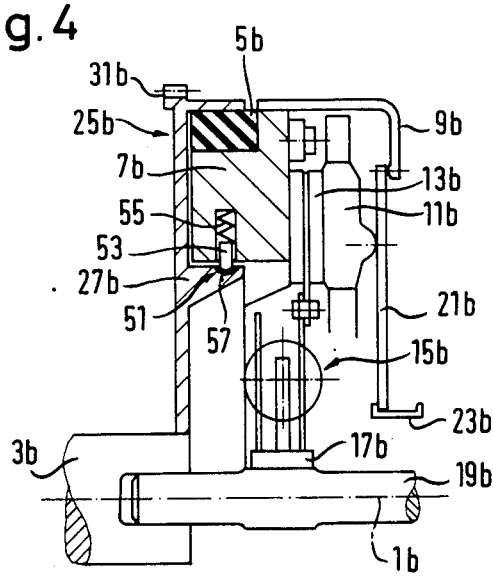

FIG. 4 shows a further friction disc clutch which differs from the friction disc clutch according to FIG. 3 essentially only in the nature of the bridge-over clutch. Parts of like effect therefore are designated with the same reference numerals, but for distinction provided with the letter b instead of the letter a. Therefore, for more detailed explanation reference is made to the description of FIGS. 1 to 3.

To bridge over the rotationally elastic element 5b, a centrifugal clutch 51 is provided having at least one centrifugal weight 53 guided in the flywheel 7b for displacement radially of the rotation axis 1b. The centrifugal weight 53 is initially stressed by a spring 55 into a detent opening 57 of the carrier 27b. The centrifugal clutch 51 is formed so that it opens approximately at the idling rotation rate and remains opened above the idling rotation rate.

In principle, other kinds of couplings can be provided for bridging over the elastic element. By way of example, in place of centrifugal clutches with shapelocking engagement it is also possible to provide a centrifugal clutch with frictional engagement. Furthermore, it is also possible for the bridging-over to be controlled in torque dependence, since at low rotation rates, especially in the idling range, only a small torque has to be transmitted. On exceeding of this small torque this bridging over of the rotationally elastic element can be liberated in dependence upon the transmitted torque.

While specific embodiments of the invention have been shown and described in detail to illustrate the application of the inventive principles, it will be understood that the invention may be embodied otherwise without departing from such principles.

We claim:

1. A friction disc clutch for a motor vehicle driven by an internal combustion engine comprising:
    (a) a flywheel driveable in rotation by the internal combustion engine about a rotation axis;
    (b) a clutch cover held on the flywheel;
    (c) a presser plate connected non-rotatably but axially displaceably with the flywheel;
    (d) a clutch disc provided with friction linings axially between the flywheel and the presser plate;
    (e) a clutch spring device braced in between the clutch cover and the presser plate;
    (f) a rotationally elastic element in a drive path between the internal combustion engine and the flywheel to damp torsional vibrations of the drive path; and
    (g) a controllable bridge-over clutch for the non-rotatable bridging over of the rotaionally elastic element at rotation rates in the region of or below an idling rotation rate of the internal combustion engine, the flywheel and a starter gear connectible non-rotatably with a crankshaft carry starter toothings arranged side by side and wherein the bridge-over clutch is formed by a starter motor pinion which in the starting of the internal combustion engine engages in common in both starter toothings, and couples them non-rotatably with one another, but otherwise is disengageable from at least one of the two starter toothings.

2. A friction disc clutch according to claim 1, wherein the flywheel is securable through the rotationally elastic element to the crankshaft axially beside the starter gear and the two starter toothings are arranged axially one beside the other.

3. A friction disc clutch according to claim 1, wherein the drive path of the motor vehicle, connected through the clutch, has a natural frequency lying below the idling rotation rate of the internal combustion engine.

* * * * *